June 10, 1924.
A. BLAZQUEZ
1,497,132
DEVICE WHICH IS APPLICABLE TO CHIMNEYS, ESPECIALLY THOSE
OF LOCOMOTIVES, TO PREVENT FIRES
Filed May 11, 1923    2 Sheets-Sheet 1
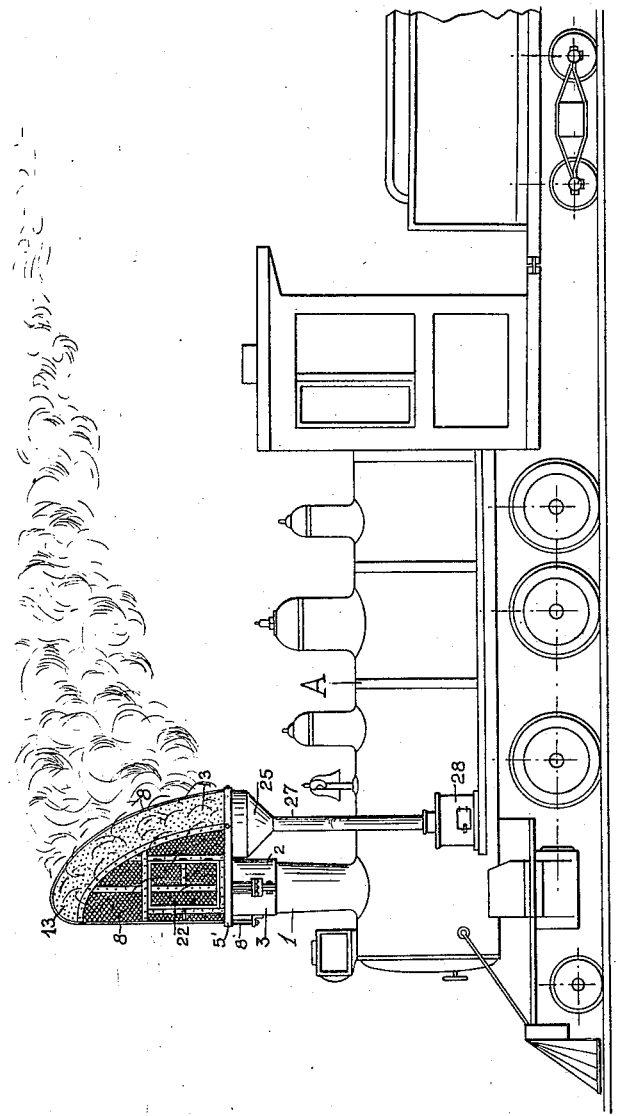

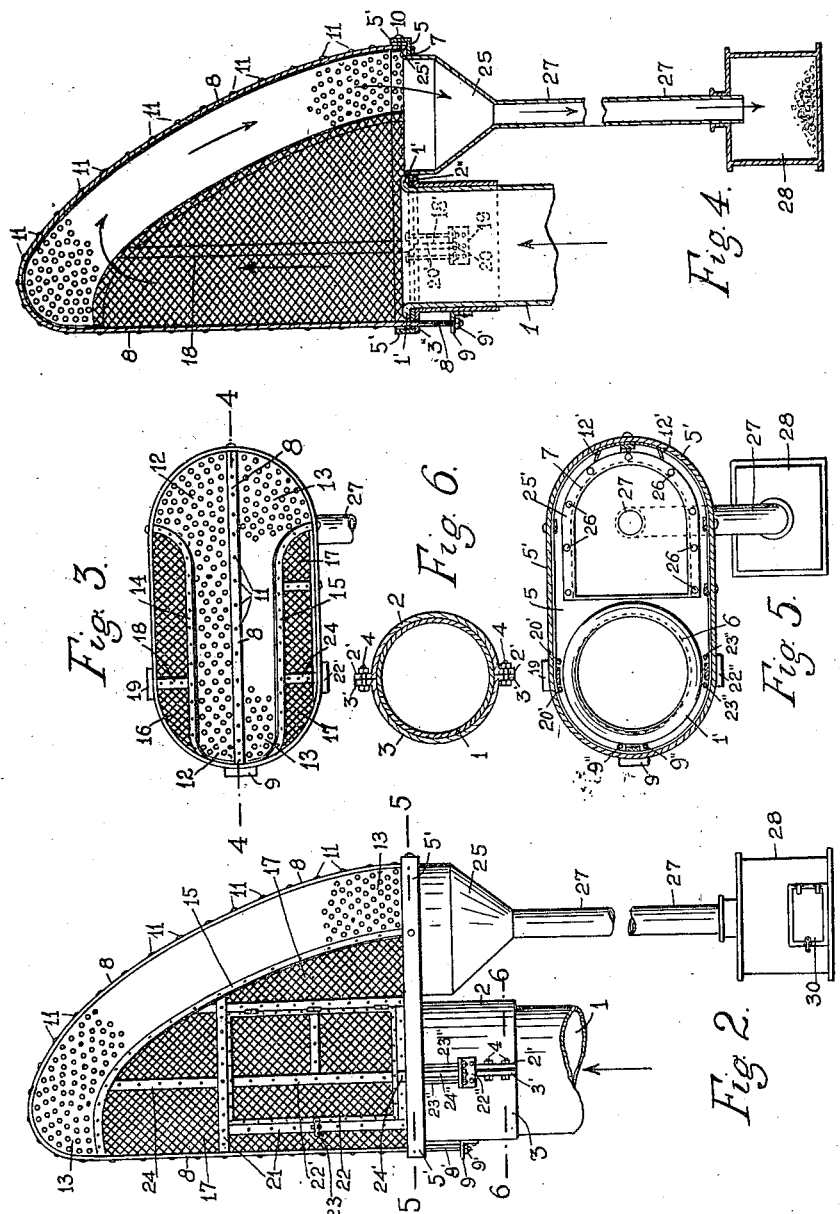

Patented June 10, 1924.

1,497,132

UNITED STATES PATENT OFFICE.

AGUSTIN BLAZQUEZ, OF SANTIAGO DE CUBA, CUBA.

DEVICE WHICH IS APPLICABLE TO CHIMNEYS, ESPECIALLY THOSE OF LOCOMOTIVES, TO PREVENT FIRES.

Application filed May 11, 1923. Serial No. 638,419.

*To all whom it may concern:*

Be it known that I, AGUSTIN BLAZQUEZ, a citizen of the Republic of Cuba, residing at Santiago de Cuba, Oriente Province, Cuba, have invented certain new and useful Improvements in a Device Which is Applicable to Chimneys, Especially Those of Locomotives, to Prevent Fires, of which the following is a specification.

This invention refers to a device used in combination with the chimneys of locomotives and also with the chimneys of machines used to level streets and roads and to chimneys of all kinds in general and has as its principal object the provision of a simply constructed device that does not deface the lines of the chimney and which completely prevents the ignited residues thrown back of these by the strength of the draft from falling on materials of easy combustion, such as straw, dried grass, etc., and produce fires which cause damage of considerable extent and even loss of life.

An object of the invention is to provide a device which applied to the chimney of the locomotives which circulate in their route through fields where plants that produce a great quantity of dried straw are cultivated, for example sugar cane, prevents particles of ignited combustible to issue from the chimney thus preventing the production of frequent fires occurring in these cultivated zones, fires which are almost always produced from the effects of these sparks. These fires in cane fields spread with tremendous rapidity causing ruin to the laborers and also not being infrequent cases of people losing their lives in said fires.

The invention provides lastly a device whose construction is extremely simple which does not cause any obstacle to the progress of the locomotives due to its form and costs very little, it can be applied to the chimneys without in any way altering the construction of these and also without the necessity of employing specially skillful labor for its installation.

Further advantages and other pertinent considerations to the invention will be deduced in the course of this specification especially by those experts in the art to which the invention pertains with the aid of the figures in the attached drawings in which the same characters of reference designate the same parts.

In the drawings:

Figure 1 is a side elevation of a locomotive, Baldwin type, provided with the device which is the object of the present invention.

Figure 2 is a side elevation of the device in detail on an enlarged scale.

Figure 3 is a top flat view of same.

Figure 4 is a longitudinal vertical section according to line 4—4 of Fig. 3.

Figure 5 is a horizontal section according to line 5—5 of Fig. 2.

Figure 6 is a horizontal section according to line 6—6 of Fig. 2.

In Figure 1 of the drawings is shown a locomotive A, Baldwin type, whose chimney 1 is provided with the device which is the object of this invention.

This device as shown in the Figures 2 to 6 inclusive consists firstly of a cylindric hoop divided in two semicircular sections terminating at the sides in flanges 2' and 3' bent outward and at the top in a flange doubled outward horizontally 2'' and 3''. Said sections fittingly surround the top part of the chimney 1, the respective flanges 2'' and 3'' remaining below the annular edge 1' which forms the top border of the chimney 1 and fixing both sections 2 and 3 together by means of bolts with nuts 4 passing through the flanges 2' and 3'.

By 5 is shown a rectangular plate but with the ends rounded or of semicircular shape having its raised edges as indicated by 5'. This plate has two openings 6 and 7 at its back, the opening 6 being circular and corresponding with the mouth or opening of the chimneys 1 so that the edge 1' of same remains resting around the edge of said opening 6 and these resting on the flanges 2''—3'' of the hoop 2—3.

The plate 5 supports a frame that is shaped approximately as a fire helmet and which is covered by walls of a suitable structure to permit the smoke from the chimney 1 to pass through it but not the ignited particles that it draws.

The frame consists of a narrow plate 8 that terminates at one end in a threaded bolt 8' which passes through registering bores at one of the plate 5 and in an angular bracket 9 riveted to section 3 of the hoop screwing on a nut 9' to its surpassing part below the angular bracket 9. At the sides of the tongue 8' are placed two smaller bolts and screws 9'' fixed between the plate 5 and the angular bracket 9 reinforcing the supports of the frame described.

The plate 8 is bent backward along the large axle of the plate 5 to fix its other end by means of bolts and rivets 10 in the raised flange of plate 5 at the opposite end of this.

At each side of the plate 8 at its highest point two plates 12 and 13 are fixed with rivets 11 and provided with small bores on its entire extension to let the smoke pass but not the residue that it draws and which plates are widened at their lower ends to cover the entire portion that forms the semi-circular end of the plate 5 where there is the opening 7 with the object that will be explained later on.

On the edges of these plates 12 and 13 are riveted metallic screens 16 and 17 with bores sufficiently united to permit passage of the smoke but not the residues of the combustion, reinforcing this union with metallic bands 14 and 15. The metallic screens 16 and 17 are of an almost triangular shape and fixes its front edges by means of rivets to the vertical part of the plate 8.

To give firmness to the referred to frame I provide a narrow plate 18 with its top end fixed to plate 14 which borders the perforated plate 12 terminating said plate 18 in a threaded pin 18' which passes through the registering bores of plate 5 and in an angular bracket 19 fixed on the hoop section 3 screwing on the extending head of the pin 18' a nut 20.

Two bolts 20 on each side of the pin 18' are fastened together also the plate 5 with the angular bracket 19.

In the perforated screen is provided an opening for inspection surrounded by a narrow plate frame 21 covered with a hinged door 22 reinforced with a plate in the shape of a T 22' and said door being provided with a suitable lock 23.

Between the top part of the frame 21 and the plate 21 that borders the perforated plate 13 is fixed a reinforcing metallic ribbon 24. And in the same line with the plates 22 and 24 there is another plate 24' fixed to the lower part of the frame 21 and ending in a threaded pin 24'' that passes through the plate 5 and of a third angular bracket 22'' fixed in section 2 of the hoop and in whose extended head end is screwed a nut having at each end of said pin 24'' two bolts 23'' that fasten together the plate 5 with the bracket 22''.

As it is evident that the pins 8', 18' and 24'' as well as the side bolts 9'', 20' and 23'' comprise a very solid fastening between the plate 5 that supports the frame and the hoop 2—3 secured to the chimney 1 and therefore this structure resists without hindrance all the force that actuates against it even at a great speed presenting furthermore less resistance in advancing due to the special long shape and decreasing section from top to bottom of the device making as little as possible the area of resistance against the force of the wind.

The bore 7 in the plate 5 is of rectangular form its outer end being semicircular and corresponding with a mill hopper 25 of the same horizontal section whose top border presents a flange 25' extended outward except in its part corresponding to the straight end of the opening 7 the flange in which is fixed on the border of the opening referred to by means of bolts or rivets 26. The hopper 25 is fixed to the top end of a downward pipe 27 that conducts the residues of the combustion, as will be shown later on, to a container 28 installed preferably on the narrow side board 29 usually in locomotives. Said deposit container 28 is provided with its dumper door 30.

From what has been previously explained the operation of this device can be easily understood. Supposing for instance it is installed in the maner shown in Fig. 1 in accord with the previous descriptions, in the progress of the locomotive the smoke on coming out of the chimney 1 passes easily through the opening of the plates 12 and 13 and the bores of the metallic screens 16 and 17 toward the back and the residues of the combustion which otherwise would be thrown out in its ignited state with the consequent dangers I am trying to prevent with the adoption of this arrangement, will strike against the top part of the perforated plates 12 and 13 and will be guided between the wings of the canal 12 until they fall to the hopper 25 and from there to the downward tube 27 to be collected in the container 28 from where they can be extracted at will by opening the door 30.

The inspection door 22 of the device permits its cleaning whenever necessary.

It is evident that within the principles of construction previously mentioned distinct changes can be made without separating from the substantial idea of the invention and likewise the constructing materials used in parts of the device may be substituted for another of like nature, preferring those in which by its quality give better results against the action of combustion gas.

I therefore desire that the patent rights be not limited to that previously expressed but what is understood within the reach of the following claims:

1. A spark arrester comprising a casing applicable to a stack, including an elongated plane base apertured to receive a stack and apertured to receive an outlet hopper, and side and top walls for connecting the stack to the outlet hopper, the rear side wall, and said top wall being formed of perforated plates.

2. A spark arrester comprising a casing applicable to a stack, including an elongated plane base apertured to receive a stack and apertured to receive an outlet hopper, and side and top walls for connecting the stack to the outlet hopper, the rear side wall, and said top wall being formed of perforated plates, the front and side walls being formed of wire screening.

3. A spark arrester comprising a casing applicable to a stack, including an elongated plane base apertured to receive a stack and apertured to receive an outlet hopper, and side and top walls for connecting the stack to the outlet hopper, the rear side wall, and said top wall being formed of perforated plates, said base receiving the stack, and the hopper in its apertures, and being bolted thereto, a narrow reinforcing strip connected to the front of the stack, and the rear of the hopper and bounding the extreme limits of the casing, and intermediate reinforcing strips, strengthening the side walls.

4. A spark arrester comprising a casing applicable to a stack, including an elongated plane base apertured to receive a stack and apertured to receive an outlet hopper, and side and top walls for connecting the stack to the outlet hopper, the rear side wall, and said top wall being formed of perforated plates, the front and side walls being formed of wire screening, said base receiving the stack and the hopper in its apertures, and being bolted thereto, a narrow reinforcing strip connected to the front of the stack, and the rear of the hopper and bounding the extreme limits of the casing, and intermediate reinforcing strips, strengthening the side walls.

5. A device applicable to chimneys, and more especially to those of locomotives, for preventing fires, comprising a sectional tire surrounding the upper part of the chimney, a base plate having an elongated base to which the tire is secured, said plate being supported horizontally over the mouth of the chimney, and bent towards the back of same, and provided with two openings, one registering with the mouth of the chimney and the other situated to the rear thereof, a hopper attached thereto, and positioned underneath, a casing made of finely bored plate, and of metallic gauze, and having a section diminishing toward the top, and having rounded ends firmly supported on the base plate, flanges projecting lengthwise on the back of the casing to guide sparks towards the hopper, an underhanging pipe connected to the hopper, and means to gather up the sparks.

In testimony whereof I have signed my name to this specification.

AGUSTIN BLAZQUEZ.